US 8,762,936 B2

(12) United States Patent
Pepin et al.

(10) Patent No.: US 8,762,936 B2
(45) Date of Patent: Jun. 24, 2014

(54) DYNAMIC DESIGN-TIME EXTENSIONS SUPPORT IN AN INTEGRATED DEVELOPMENT ENVIRONMENT

(75) Inventors: Brian K. Pepin, Seattle, WA (US); Fred W. Balsiger, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1872 days.

(21) Appl. No.: 11/449,897

(22) Filed: Jun. 9, 2006

(65) Prior Publication Data

US 2007/0288887 A1 Dec. 13, 2007

(51) Int. Cl.
*G06F 9/45* (2006.01)
(52) U.S. Cl.
USPC .......................................................... 717/105
(58) Field of Classification Search
USPC .......................................................... 717/105
See application file for complete search history.

(56) References Cited

U.S. PATENT DOCUMENTS

| 7,284,233 | B2 * | 10/2007 | Sengodan | 717/102 |
|---|---|---|---|---|
| 2002/0047863 | A1 * | 4/2002 | Hyman | 345/744 |
| 2004/0148570 | A1 * | 7/2004 | Sengodan | 715/513 |
| 2004/0148585 | A1 * | 7/2004 | Sengodan | 717/101 |
| 2007/0046699 | A1 * | 3/2007 | Sowizral et al. | 345/661 |

* cited by examiner

*Primary Examiner* — John Chavis
(74) *Attorney, Agent, or Firm* — Kevin Sullivan; Kate Drakos; Micky Minhas

(57) ABSTRACT

An Integrated Development Environment (IDE) is provided which comprises a visual designer that supports at least two avenues of extension. First, the visual designer may be extended with entirely new features by adding a visual designer extension. The visual designer extension is a deriving class of an extension server object. The extension server object may be provided along with the IDE. The visual designer extension manages a list of extension objects, and exposes a service provider to such extension objects. The visual designer extension can request and publish services through the service provider. Second, the visual designer may be extended with new variations of existing features by adding additional extension objects that derive from, and are managed by, an existing visual designer extension. These two modes of extension are supported by a novel visual designer framework described herein.

19 Claims, 8 Drawing Sheets

DYNAMIC DESIGN-TIME EXTENSIONS SUPPORT IN AN INTEGRATED DEVELOPMENT ENVIRONMENT

BACKGROUND

An Integrated Development Environment (IDE) comprises computer software that assists computer programmers in developing software. Modern examples of IDE products are ECLIPSE®, NETBEANS®, VISUAL STUDIO®, and VISUAL BASIC®.

IDEs may comprise a host of useful features, such as a source code editor, a compiler, an interpreter, build-automation tools, a debugger, a version control system, and various tools to simplify the construction of a Graphic User Interface (GUI). A class browser, an object inspector, and a class hierarchy diagram may also be provided to assist in object oriented software development. Some IDEs support multiple programing languages. While most modern IDEs are graphical, IDEs in use before the advent of windowing systems and even some modern IDEs are text-based, using function keys to perform various tasks. TURBO PASCAL® is an example of a text-based IDE.

IDEs increasingly support visual programming. Visual programming allows computer programmers to create new applications at least in part by manipulating graphical objects on a visual design surface. For example, a programmer may design an application by moving programming building blocks or code nodes to create flowcharts or structure diagrams which are then compiled or interpreted. These flowcharts are often, though not necessarily, based on the Unified Modeling Language (UML). In another example, a programmer may create an application GUI by manipulating graphical objects, such as by dragging and dropping new buttons (or other graphical objects) onto a visual design surface for the desired GUI, then setting the desired properties of the buttons, and so forth.

Because software may be designed to provide an infinite range of useful functions for an equally large range of use scenarios, and GUI design is also highly customizable to best suit the particular needs of a specific software application, it is common for IDEs to be extended by computer programmers to better serve a programmer's particular needs. It is neither possible nor desirable for a single IDE to provide the full range of functions that every programmer may desire. Such an IDE would be too large and complex for any individual computer programmer. For this reason, a wide range of extensions for popoular IDEs such as VISUAL STUDIO® become available over time. Such extensions may be created and made available by the original developer of the IDE (in this case MICROSOFT® Corporation of Redmond, Wash.) or by third-party developers who discover and create useful extensions to address a particular need, and may sell or otherwise distribute their extension to others.

The importance of IDE extensibility also applies to visual designers. Extensions to a visual designer tool can increase productivity in development of software by making a host of extended functions readily available to the computer programmer. However, many features of modern IDE visual designers are either difficult or impossible to extend. While additional variations of visual designer feature types that were included in an original visual designer may be added, it is either very cumbersome or impossible to add completely new feature types to modern visual designers. There is a need in the industry for better extensibility support in IDE visual designers.

SUMMARY

In consideration of the above-identified aspects and challenges facing the IDE product landscape, the present invention provides systems and methods for dynamic design-time extensions support in an IDE. An IDE is provided which comprises a visual designer that is constructed in such a way as to support at least two avenues for extending such visual designer.

First, the visual designer may be extended with new feature types by adding extension server objects. The extension server object may be derived from an object that is provided along with the IDE. The extension server object manages a list of extension objects, and exposes a service provider to such extension objects. Second, the visual designer may be extended with new variations of existing feature types by adding additional extension objects that derive from, and are managed by, an existing extension server object.

These two modes of extension can be supported by a framework comprising an editing factory configured to create an editing store object. The editing store object in turn maintains a set of editable objects that represent items on a visual design surface. The editing store object may also create an extension manager object and an editing context. The editing context provides storage for services and data used by the extension server objects, and the extension manager object manages a list of extension server objects, which are responsible for communicating with the various associated extension objects.

Other advantages and features of the invention are described below.

BRIEF DESCRIPTION OF THE DRAWINGS

The systems and methods for dynamic design-time extensions support in an IDE in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
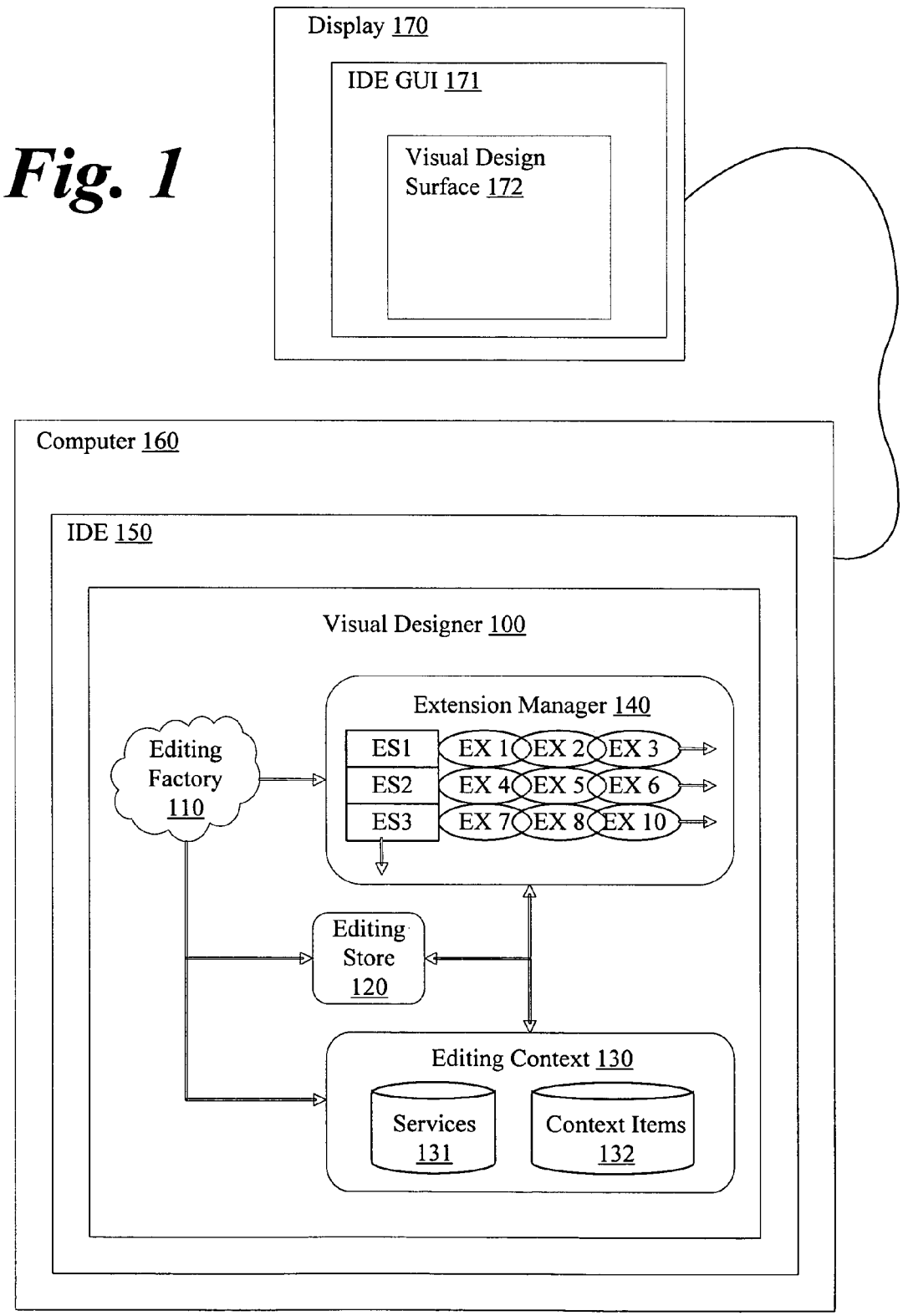
FIG. 1 illustrates an overview of a visual designer architecture.

FIG. 1 illustrates an overview of a visual designer 100 architecture, and also illustrates a general operating environment of the visual designer 100. In general, visual designer 100 can provide a visual design-time tool for developers of computer programs and GUIs. As such, designer 100 may be incorporated into IDE 150 software which may provide a variety of other useful functions for computer programmers. For example, IDE 150 may support simultaneous execution of multiple designers such as 100, as well as any of the various exemplary IDE functions set forth in the background section.

IDE 150 may execute on a computer 160 that is operably coupled to a display 170 such as a computer screen. A general purpose exemplary computing device is broadly described with reference to FIG. 8. Visual designer 100 and IDE 150 may access any of a wide range of software and hardware functions associated with computer 160 to control the content presented on display 170. Such components and functions are understood in the art and detailed description thereof would only distract from the invention. Suffice to say that IDE 150 may present an IDE GUI 171 to a user via display 170. IDE GUI 171 may expose to a user various useful functions associated with the IDE 150. Visual design surface 172 may be presented by visual designer 100 as part of the general user experience associated with the IDE GUI 171.

The user may interact with the visual design surface 172, for example by using a mouse or other selection device to manipulate graphical representations associated with a computer program or GUI that the user is designing. The user experience in such interactions is a result of the "feature types" that are exposed to the user, and in particular, the "variations of feature types" exposed to the user. A feature type is a way of exposing useful functions to a user, while a variation of a feature type refers to a particular function that is exposed in the manner governed by the underlying feature type. A few examples should make this distinction clear.

One very common feature type is the drop-down menu. In most GUIs, a user is presented with a horizontal list of function categories across the top of the GUI, such as "File," "Edit," Insert," Format," "Tools," "Table," "Window," and so on. Selecting any of the categories causes a drop-down menu to appear. The drop-down menu provides a plurality of selectable functions. Here, providing selectable drop-down menus is an example of a feature type, while the individual categories ("File," "Edit," Insert," and so forth) are variations of the feature type. Similarly, the particular selectable functions in each category (e.g. "New," "Open," "Close," "Save," etc.) are variations of the feature type.

Another feature type with which may modern computer users are familiar is the "smart tag." A smart tag is a small icon or other indication that automatically appears next to a displayed item. When the icon is selected, e.g., by mouse-over or mouse click, a list of potential actions to take is displayed. For example, when the popular word processing program MICROSOFT WORD® automatically corrects a misspelled word, it also displays a smart tag. On mouse-over of the smart tag, three options are presented: "change the word back to original spelling," "stop auto-correcting this word," and "go to auto-correct options." The user may easily take any of these options then and there. Here, the smart tag is a feature type, while the specific actions offered, such as "change the word back to original spelling," are variations of the feature type. Other variations of this feature type include the circumstances in which a smart tag is displayed. For example, displaying a smart tag when a word is auto-corrected is one variation, while displaying a smart tag next to a numbered list, e.g., a tag that allows the user to "undo automatic numbering," "stop automatically creating numbered lists," and so forth is another variation of the feature type.

A final example of a feature type is the grab handle. When a shape is selected in the GUI of many computer programs, the user is presented grab-handles for resizing the shape in each direction. The grab-handle is a feature type, and a variety of variations of this feature type exist, for example the user might resize a rectangle by moving one side thereof with a grab handle, or the user might impart curved shape to a side of the rectangle using another variation of the grab handle feature type.

Returning to FIG. 1, an IDE 150 is illustrated which comprises a visual designer 100, said visual designer 100 comprising an extension manager 140 configured to load one or more extension server objects, e.g. ES1, ES2 and ES3, said extension server objects corresponding to feature types as described above. New feature types can be added to said visual designer 100 by adding new extension server objects.

The extension server objects ES1-ES3 communicate with one or more extension objects, e.g., ES1 communicates with EX 1-EX 3, ES2 communicates with EX 4-EX 6, and so forth. The extension objects provide variations of the underlying feature type supported by the corresponding extension server object. New variations of feature types can be added to said visual designer 100 by adding new extension objects.

FIG. 1 also illustrates an editing store 120 which represents the visual designer's 100 back-end. In the illustrated embodiment, an editing factory 110 creates the editing store object 120, which then creates the extension manager 140 and an editing context 130. The editing store 120 maintains the set of editable objects that represent the items on the visual design surface 172. There is no requirement for objects within the editing store 120 to be of the same technology as the objects being designed on the design surface 172 (referred to herein as editable objects). Serialization, transaction support, and other low-level operations may exist in the editing store 120. The extension manager 140 manages a list of extension server objects ES1-ES3. Each extension server object is responsible for communicating with its extension objects. The editing context 130 provides storage for services and data used by the designer. Thus, in one embodiment, various of the components illustrated in FIG. 1 may have roles as follows:

| Component | Role |
| --- | --- |
| EditingStore | Provides all persistence of editable objects, undo, redo, change notifications, and maintains the list of running objects in the designer. |
| EditingContext | Provides a place to hold services and other information that must be shared within the designer. Provides a rich set of notifications when data within it changes. |
| ExtensionManager | Provides the main extension mechanism for the designer. In one embodiment, the designer does nothing without extensions. The extension manager controls the loading of extensions. |

The embodiment of FIG. 1 and variations thereof offer a truly extensible visual design-time architecture. In one aspect, substantially all features of visual designer 100 can be based entirely on the illustrated extensibility mechanisms. This allows for visual designers that are flexible and adaptable in terms of visuals and semantics and may be easily customized to meet individual programming needs. The illustrated architecture exposes light weight extensibility points for factoring and ease-of-development. This architecture is not specific to any one technology, and new feature types and variations of feature types may be applied to any number of settings. Moreover, any type or object may be designed, independent of class reference. For example, WinForms requires "designable" objects to implement IComponent. This can easily be accomplished in the illustrated architecture. Another advantage of the illustrated architecture is it creates a logical separation between the document and view models.

Figure 2:
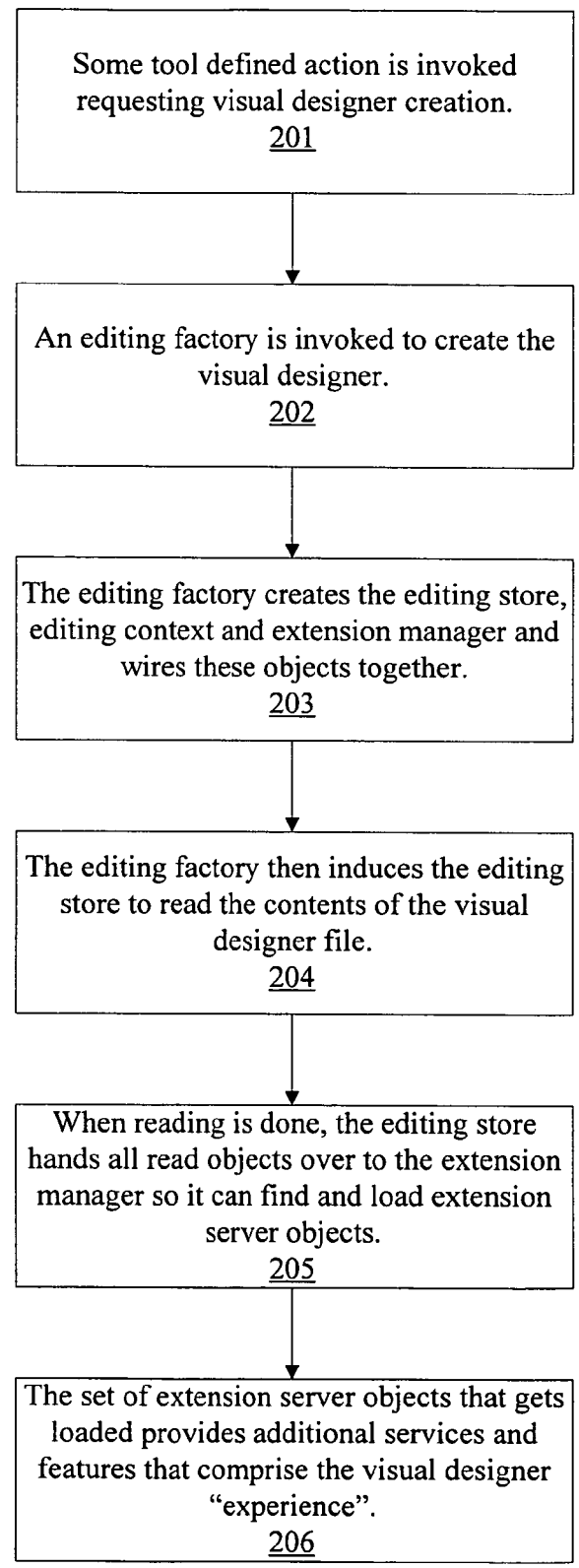
FIG. 2 illustrates creation of a visual designer in a computer system comprising an IDE.

FIG. 2 illustrates a series of steps/pseudo-code which demonstrates how a set of objects may be obtained from a domain object model to ultimately create a visual designer. Creating a visual designer refers to instantiating the designer such that it may be used for its purpose, along with the various extension server objects and extension objects corresponding to the designer. As illustrated in FIG. 2, in one embodiment of the invention a system comprising a computer running IDE software comprising a visual designer may perform a method comprising:

1. Some tool defined action is invoked requesting visual designer creation 201. For example, a user may invoke a tool that generates a request to instantiate a visual designer. The request is received by the IDE.
2. An editing factory is invoked to create the visual designer 202.
3. The editing factory creates the editing store, editing context and extension manager and wires these objects together 203.
4. The editing factory then induces the editing store to read the contents of a visual designer file 204. The visual designer file can list the various extension server objects associated with the visual designer, as well as the extension objects associated therewith.
5. When reading is done, the editing store hands all read objects over to the extension manager so it can find and load extension server objects 205. This entails instantiating, by said extension manager object, at least one extension server object. As discussed above, the extension server object corresponds to and supports a feature type. The extension manager may thereafter manage a list of extension server objects associated with the visual designer.
6. The set of extension server objects that gets loaded provides additional services and features that comprise the designer "experience" 206. This will in many cases entail loading, by said extension server object, at least one extension object corresponding to a variation of said feature type. In a preferred embodiment in which the visual designer is built for deep extensibility, substantially all features of the visual designer correspond to said at least one extension server object. A user may create, purchase, or otherwise acquire new extension server objects and subsequently load them with the visual designer. Similarly, the user may create, purchase, or otherwise acquire new extension objects.

Figure 3:
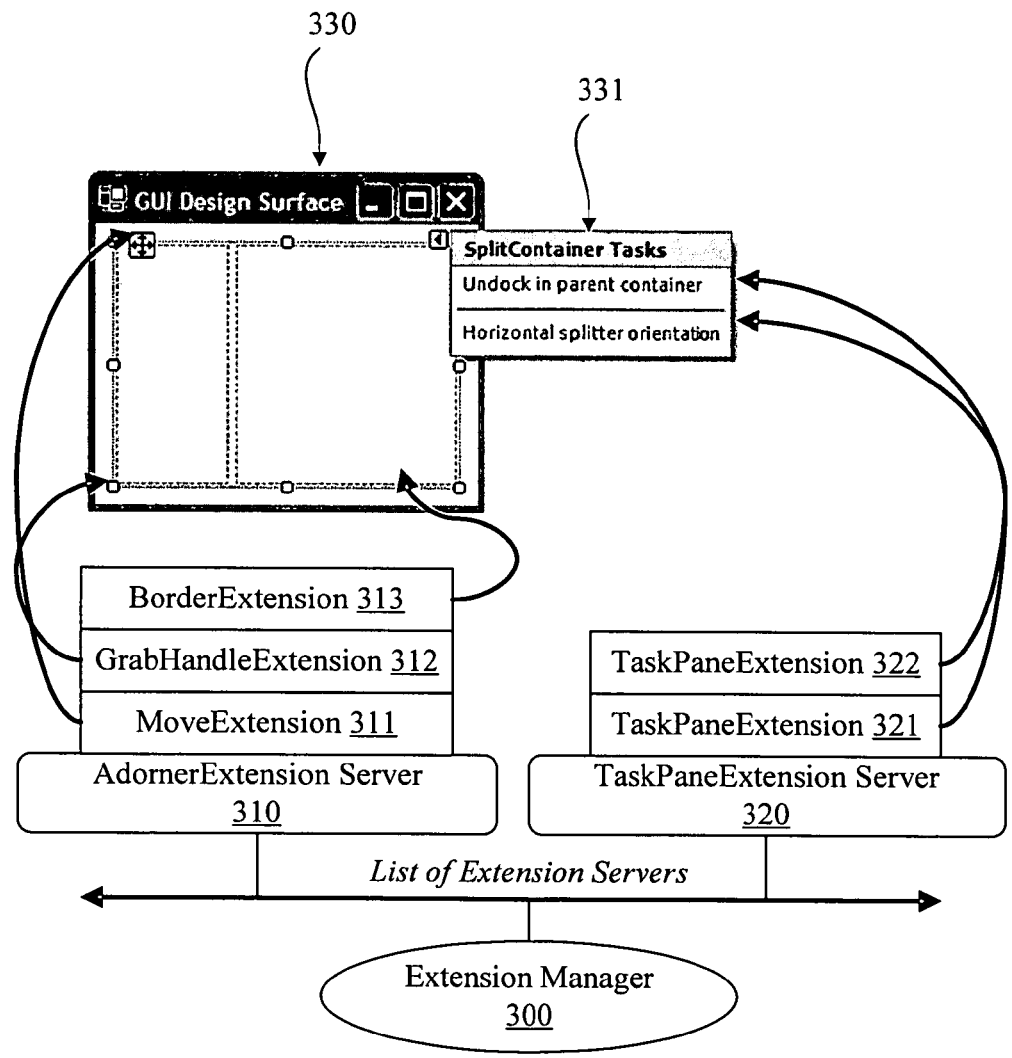
FIG. 3 illustrates an extension manager, extension server objects, and extension objects which ultimately provide a user with variations of feature types that are useable on a visual design surface.

FIG. 3 illustrates another view of an extensionServer/extension extensibility architecture which exposes two different ways to add value to a visual designer. FIG. 3 contemplates an IDE comprising a visual designer corresponding to a design surface 330. The visual designer may comprise a first means for extending said visual designer by adding a new feature type. Here, the first means corresponds to extension manager 300 which maintains an extensible list of extension server objects such as 310 and 320. The underlying IDE can provide a extension server object from which objects such as 310 and 320 may be derived. As suggested by FIG. 3, extension server objects 310, 320 may be customized to provide any visual designer feature type, e.g., adorners 310 or task panes 320. Extension servers 310 and 320 each manage a list of extension objects and expose the deepest level of extensibility by exposing a service provider to deriving classes. Through a service provider, extension servers 310 and 320 can request and publish services, listen to events, and exist for the lifetime of a visual designer instance. Selection User Interface (UI) and object-specific serialization are additional examples of what might be implemented as extension server objects.

FIG. 3 also illustrates a second means for extending the visual designer, said second means comprising means for creating an extension object that derives from an existing extension server object. Means for creating the extension object may also be embodied in extension manager, which can be configured to support new extension objects 311-313 and 321-322 associated with extension server objects 310 and 320.

Here, extension objects such as 311-313 and 321-322 are lightweight features or add-ins which may not require much from the visual designer itself and are simply created and destroyed within a given context. Extension objects 311-313 and 321-322 could be used to add new UI, e.g., additional grab handles, on the visual designer's design surface 330, or perhaps to modify some basic behavior such as dragging objects around on the design surface 330. Extension objects 311-313 and 321-322 are managed by the extension server objects 310 and 320, respectively, and provide a variations of feature types provided by said existing extension server objects 310 and 320. For example, extension server object 320 provides a feature type corresponding to 331, while extension objects 321 and 322 provide the listed variations of the underlying feature type.

The illustrated extension architecture supports the ability to plug in custom derived extension objects. This allows for total customization of a visual designer's appearance and/or behavior. By exposing at least two different levels of extensibility—extension server objects for new feature types, and extension objects for new variations of existing feature types, an approach such as that of FIG. 3 provides a more intuitive extensibility model.

Figure 4:
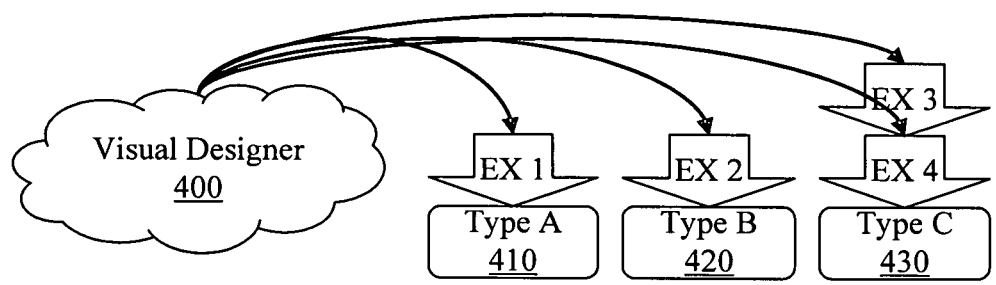
FIG. 4 illustrates creating extension object associations to types.

FIGS. 4, 5, 6, and 7 illustrate aspects of one particular embodiment of the invention. FIG. 4 illustrates that custom metadata attributes may be used to create associations between extension server objects, extension objects, and types. As illustrated in FIG. 4, a visual designer 400 may wish to associate extensions EX 1-EX 4 to types 410, 420, 430 through metadata attributes. This is advantageous because metadata is a well-accepted way to provide dynamic information on types or instances. A markup language such as the Extensible Markup Language (XML) may be used as a declarative way to bind this metadata to actual runtime objects or instances. In one embodiment, this binding is a requirement at the tool-level and is not the responsibility of a design-time framework.

There may be two types of attributes implemented in this architecture: an ExtensionAttribute and an ExtensionServerAttribute. In such an embodiment, ExtensionAttributes may be discovered on types or instances of the editable objects, and simply expose a property representing a type of extension object.

The ExtensionServerAttribute decorates an extension server class and indicates which type of extension server is required to host a specified extension object. The extension manager may be configured to take responsibility for creating these extension servers when editing objects that are passed to it.

Figure 5:
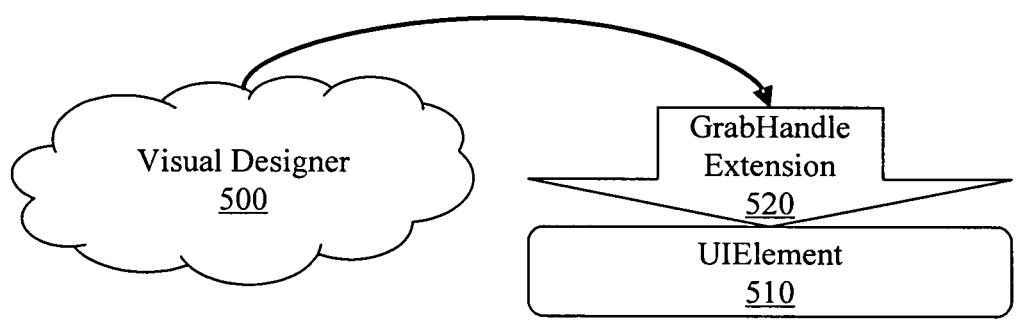
FIG. 5 illustrates one embodiment of associating a grab handle extension object with a UIElements type.

Consider a visual designer in which the editable objects are of type UIElement. Visually representing selection and enabling manipulation of these UIElements may entail using one or more "grab handles" to adorn boundaries of individual items. This may be accomplished as illustrated in FIG. 5, by the visual designer 500 associating a grab handle extension 520 to all types of UIElements 510 via metadata.

Figure 6:
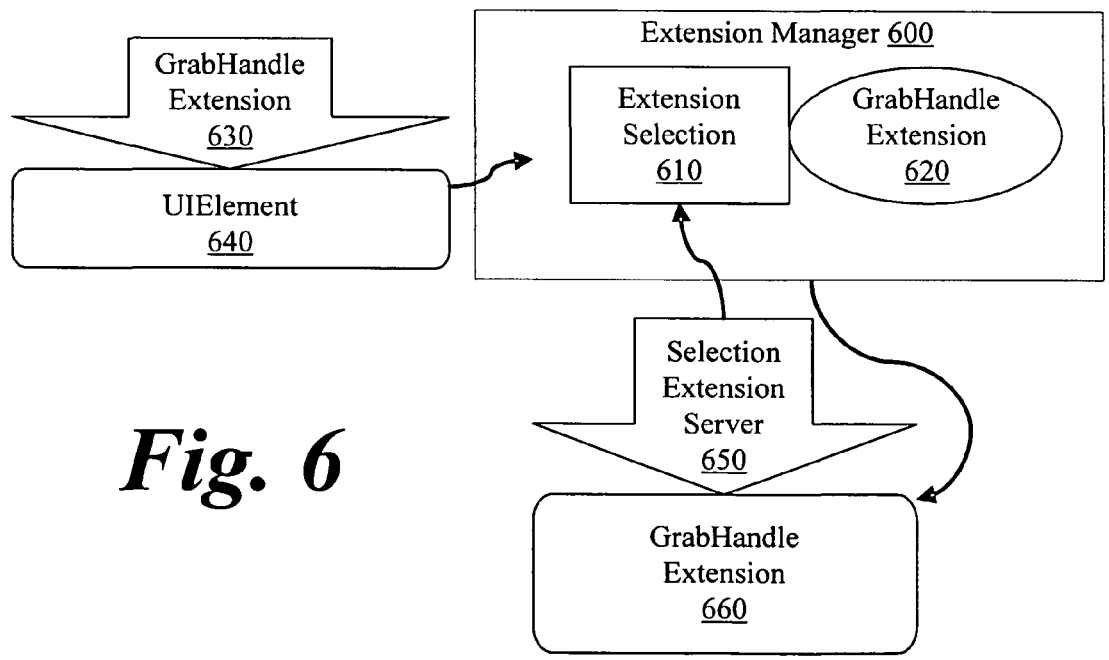
FIG. 6 illustrates an exemplary extension manager that discovers an creates an extension server object and an extension object.

FIG. 6 illustrates extension server object discovery and creation by an extension manager. An exemplary UIElement 640 exists in an editing store and was passed to the extension manager 600 for analysis. At this time, the GrabHandleExtension 620 is discovered by metadata associated with the UIElement 640. The base type of the GrabHandleExtension will be inspected via metadata, in order to determine its required extension server. This can be carried out by a extension selection component 610 in the extension manager 600. An ExtensionServer of type SelectionExtensionServer 650 will be identified and created if it does not already exist. Finally, the GrabHandleExtension 660 can be loaded by the SelectionExtensionServer 650.

Figure 7:
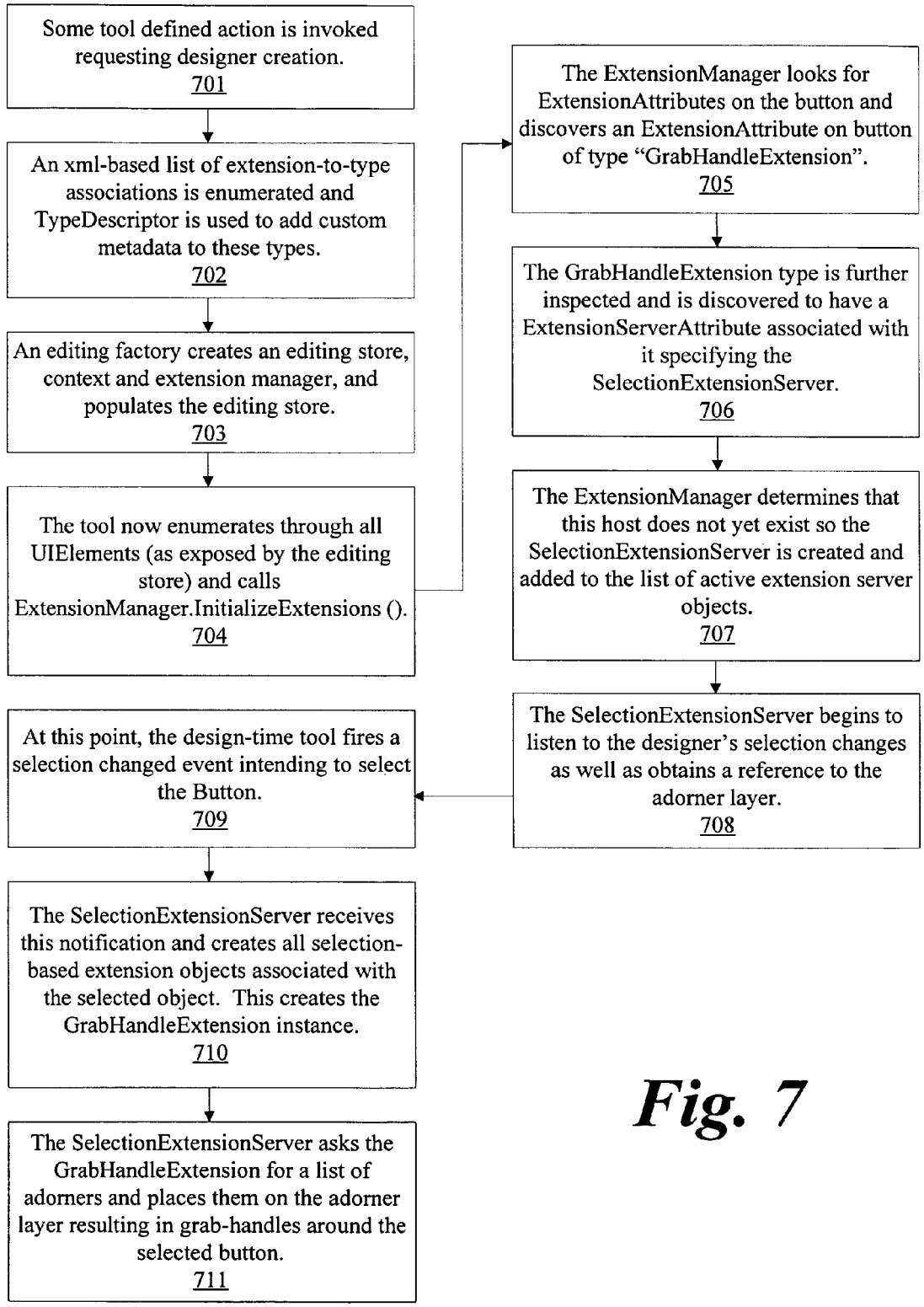
FIG. 7 illustrates a scenario in which a visual designer is created and a button is selected on the visual design surface.

FIG. 7 illustrates a steps/pseudo-code example which elaborates somewhat on the example provided in FIG. 2. Consider a scenario where a specific visual designer is created, as described in this document, then a single UIElement (a button) is selected on the visual design surface. FIG. 7 provides a exemplary set of steps which may be performed from creation of the visual designer to a successful selection change:

1. Some tool defined action is invoked requesting visual designer creation 701.
2. An xml-based list of extension-to-type associations is enumerated and TypeDescriptor is used to add custom metadata to these types 702. Example: GrabHandleExtension will be associated to all UIElements (including deriving types). Refer back to FIG. 5.
3. An editing factory creates an editing store, context and extension manager, and populates the editing store 703.
4. The tool now enumerates through all UIElements (as exposed by the editing store) and calls ExtensionManager.InitializeExtensions( ) 704.
   a. (Assume a button element is declared in this hierarchy) The ExtensionManager looks for ExtensionAttributes on the button and discovers an ExtensionAttribute on button of type "GrabHandleExtension" 705.
   b. The GrabHandleExtension type is further inspected and is discovered to have a ExtensionServerAttribute associated with it specifying the SelectionExtensionServer 706.
   c. The ExtensionManager determines that this host does not yet exist so the SelectionExtensionServer is created and added to the list of active extension hosts 707. Refer back to FIG. 6.
   d. The SelectionExtensionServer begins to listen to the visual designer's selection changes as well as obtains a reference to the adorner layer 708.
5. At this point, the design-time tool fires a selection changed event intending to select the button 709.
6. The SelectionExtensionServer receives this notification and creates all selection-based Extensions associated with the selected object. This creates the GrabHandleExtension instance 710.
7. The SelectionExtensionServer asks the GrabHandleExtension for a list of Adorners and places them on the adorner layer resulting in grab-handles around the selected button 711.

Exemplary Extension Server Object

As mentioned earlier, extension server objects are the lowest level of extensibility exposed by the architecture provided herein. Extension server objects are created given a reference to an editing context. This implies that extension server objects are not only allowed to listen to global services but are also allowed to add their own services. The abstract ExtensionServers class may also implement IDisposable, promoting a simple cleanup strategy during dispose operations.

Extension server objects may be demand-created. When the extension manager discovers an ExtensionServerAttribute on an extension, it will create the specified extension server object if its type does not already exist. This allows for a bootstrapping type of methodology whereby extension server objects are only created once they are discovered, instead of having a visual designer session create a default set at startup.

Most of the functionality of the ExtensionServer class can be concentrated within the protected CreateExtensionso method. Passing an object into this method can cause the extension server object to search for ExtensionAttributes on the object. If these attributes are found, the extension instance associated with each attribute is created and returned in a list from the method.

Consider the following sample code of a extension server object. This extension server object is responsible for listening to selection changes on a design surface, and proffering appropriate UI to an adorner layer based on selection:

```
public class SelectionExtensionServer :
    ExtensionServer<GrabHandleExtension> {
    /// Constructor that is given a service provider
    public SelectionExtensionServer (EditingContext context)
        : base(context) {
        //At construction time, begin listening to selection changes
    }
    /// Fires when the Designer's selection changes
    private void SelectionChanged(object sender, EventArgs e) {
        //Clear the list of existing selection Adorners
        //Now, call our base protected method to find and create
        //all extensions associated with this object.
        //NOTE: ideally, this call would be cached for performance
        //reasons
        IEnumerable<GrabHandleExtension> des =
            CreateExtensions(selectedElement);
        //Loop through the extensions, if they are UI-related add them
        //to the adorner layer.
        foreach (GrabHandleExtension grabHandleEx in des) {
            AdornerLayer.Add(grabHandleEx.GetAdorners(selectedElement));
        }
    }
    /// Dispose implementation for SelectionExtensionHost
    protected override void Dispose(bool disposing) {
        //Clear any Adorners we added and un-sync selection!
    }
}
```

Exemplary Extension Object

Extension objects are intended to be lightweight points of extensibility. Many common scenarios involving designer extensibility will favor deriving from existing extension server classes, not creating new extension servers. As mentioned before, extension objects should not keep state since they should be designed to be created and destroyed multiple times.

In one embodiment, extension objects are completely managed by extension server objects and are associated to objects through metadata, specifically the ExtensionAttribute. It is the responsibility of the extension server objects to discover extension object types from this metadata and the responsibility of the extension manager to identify a required extension server object for every extension discovered.

Common extension object implementations may range from: Selection Adorners, Verbs, Property Editors, and so on. Consider the following sample code corresponding to a extension object entitled "GrabHandleExtension:

```
/// This attribute states that the extension requires
/// a SelectionExtensionServer to be created.
[ExtensionServer(typeof(SelectionExtensionServer))]
public class GrabHandleExtension : Extension {
    // exposes a public constructor
    public GrabHandleExtension ( ) : base( ) { }
    // This method will return the grabhandles adorners
    public virtual IEnumerable<Adorner>
    GetAdorners(object selectedElement) {
        // create a 1-length list representing our grabhandle adorner...
        List<Adorner> adorners = new List<Adorner>( );
        adorners.Add(new GrabHandleAdorner(selectedElement));
        return adorners;
    }
}
```

Figure 8:
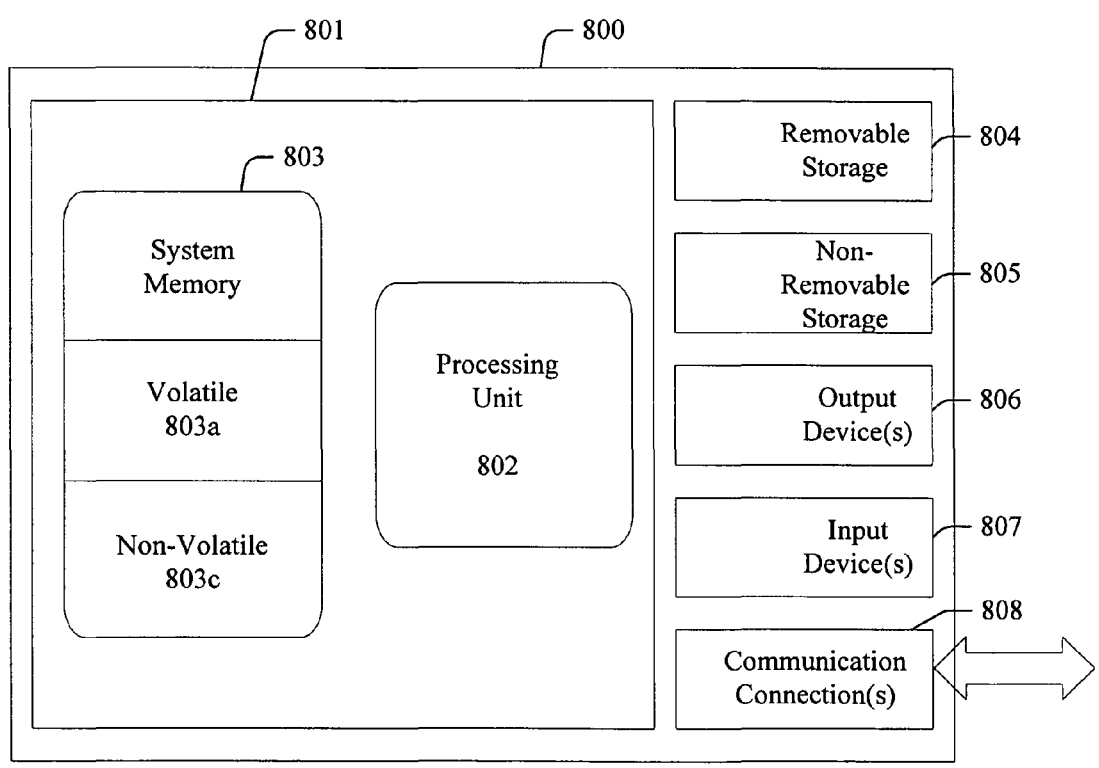
FIG. 8 illustrates general aspects of a computing device suitable for use in conjunction with the IDE software as may be provided in aspects of the invention.

FIG. 8 illustrates an exemplary computing device 800 in which the various systems and methods contemplated herein may be deployed. An exemplary computing device 800 suitable for use in connection with the systems and methods of the invention is broadly described. In its most basic configuration, device 800 typically includes a processing unit 802 and memory 803. Depending on the exact configuration and type of computing device, memory 803 may be volatile (such as RAM), non-volatile (such as ROM, flash memory, etc.) or some combination of the two. Additionally, device 800 may also have mass storage (removable 804 and/or non-removable 805) such as magnetic or optical disks or tape. Similarly, device 800 may also have input devices 807 such as a keyboard and mouse, and/or output devices 806 such as a display that presents a GUI as a graphical aid accessing the functions of the computing device 800. Other aspects of device 800 may include communication connections 808 to other devices, computers, networks, servers, etc. using either wired or wireless media. All these devices are well known in the art and need not be discussed at length here.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, cell phones, Personal Digital Assistants (PDA), distributed computing environments that include any of the above systems or devices, and the like.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. An Integrated Development Environment (IDE) system comprising:
    a processor;
    memory having stored therein instructions executed by the processor;
    a visual designer comprising an extension manager configured to load one or more extension server objects, said extension server objects corresponding to feature types, wherein new feature types are extendible to said visual designer by adding new extension server objects;
    wherein said one or more extension server objects communicate with one or more extension objects, said extension objects providing variations of the feature types, and wherein new variations of the feature types are extendible to said visual designer by adding new extension objects,
    the extension manager loading a first extension server object corresponding to an adorner feature type, the first extension server object communicating with at least a first extension object associated with a first variation of the adorner feature type, the IDE system causing the first variation of the adorner feature type to be exposed to a user in a visual design surface that allows the user to interact with graphical representations associated with a program or interface being designed.

2. The IDE system of claim 1, further comprising an editing store that is configured to create said extension manager and an editing context that provides storage for data used by said visual designer.

3. The IDE system of claim 2, wherein said editing store also maintains at least one editable object corresponding to an item that is visually represented on the visual design surface.

4. The IDE system of claim 2, wherein said editing context is configured to provide at least one notification when data within said editing context changes.

5. The IDE system of claim 1, wherein substantially all features of said visual designer correspond to said one or more extension server objects.

6. The IDE system of claim 1, wherein said one or more extension server objects are configured to request services, publish services, and listen to events through a service provider.

7. An Integrated Development Environment (IDE) system comprising:
    a processor;
    memory having stored therein instructions executed by the processor;
    a visual designer comprising:
        a first means for extending said visual designer by adding new feature types, said first means comprising means for deriving a first extension server object, wherein said first extension server object provides an adorner feature type;
        a second means for extending said visual designer, said second means comprising means for creating an extension object that derives from said first extension server object, wherein said extension object is managed by said first extension server object, and wherein said extension object provides a variation of the adorner feature type provided by said first extension server object,
    the IDE system causing the variation of the adorner feature type to be exposed to a user in a visual design surface that allows the user to interact with graphical representations associated with a program or interface being designed.

8. The IDE system of claim 7, further comprising means for loading said first extension server object when creating said visual designer.

9. The IDE system of claim 8, wherein said means for loading comprises an extension manager that also manages a list of extension server objects.

10. The IDE system of claim 9, further comprising means for creating an editing context that provides storage for data used by said visual designer.

11. The IDE system of claim 10, further comprising means for generating at least one notification when data within said editing context changes.

12. The IDE system of claim 7, wherein substantially all features of said visual designer correspond to extension server objects creatable by said first means.

13. The IDE system of claim 7, wherein said first extension server object are configured to request services, publish services, and listen to events through a service provider.

14. In a system comprising a computer running Integrated Development Environment (IDE) software, said IDE software comprising a visual designer, a method comprising:
    receiving a request to instantiate said visual designer;
    creating an extension manager object;
    instantiating, by said extension manager object, a first extension server object, wherein said first extension server object corresponds to an adorner feature type;
    loading, by said first extension server object, at least one extension object corresponding to a variation of said adorner feature type; and
    exposing the variation of the adorner feature type to a user in a visual design surface that allows the user to interact with graphical representations associated with a program or interface being designed.

15. The method of claim 14, wherein substantially all features of said visual designer correspond to extension server objects.

16. The method of claim 14, further comprising creating, by a user, a new extension server object.

17. The method of claim 16, further comprising creating, by a user, a new extension object.

18. The method of claim 17, further comprising associating said new extension object with said new extension server object using extension attribute metadata.

19. The method of claim 14, further comprising creating an editing context and generating at least one notification when data within said editing context changes.

* * * * *